United States Patent Office 2,793,830
Patented May 28, 1957

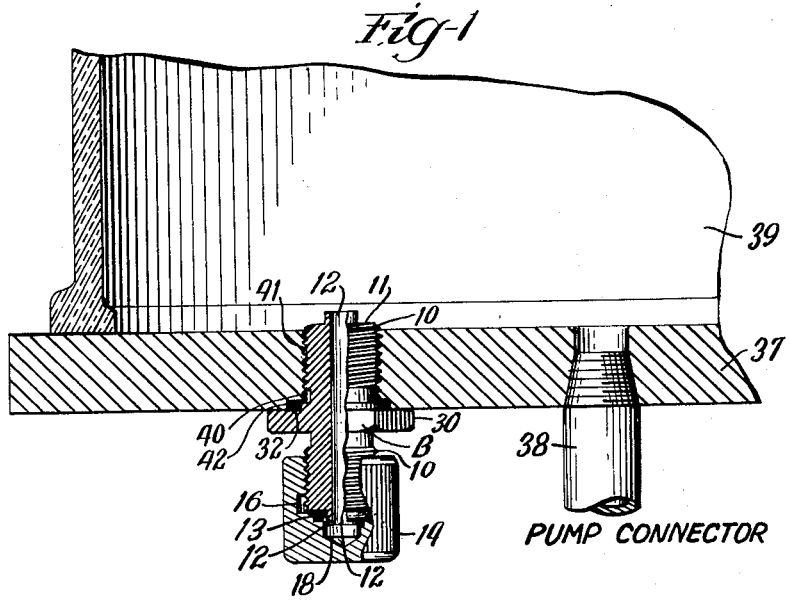
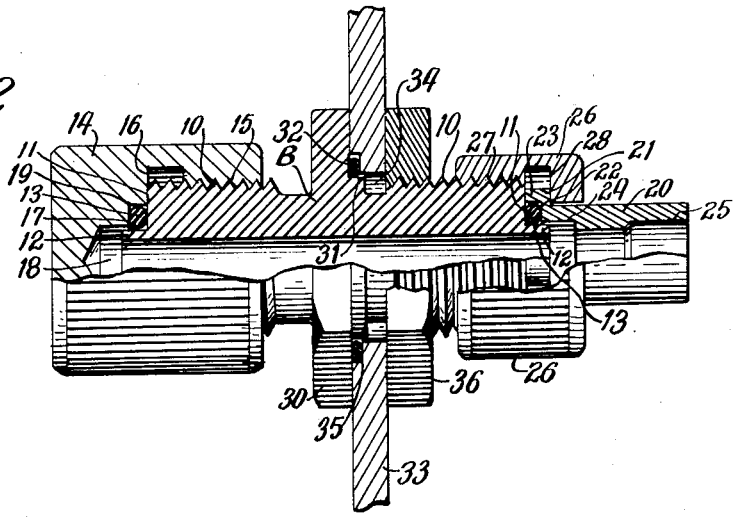
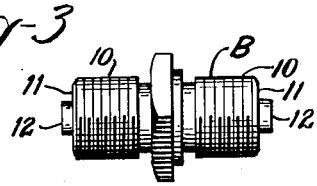

---

2,793,830
VACUUM RELEASE VALVES

Edward M. Nakaji, Chicago, and Harris M. Sullivan, Evanston, Ill., assignors to Central Scientific Company, a corporation of Illinois Application August 25, 1952, Serial No. 306,271

1 Claim. (Cl. 251—147)

---

This invention relates to vacuum release valves, and has for its principal object to provide a valve that can be connected readily with vacuum apparatus, and can be opened and closed by hand.

In this preferred embodiment:

Fig. 1 is a section through the valve and a portion of a pump plate and a bell jar;

Fig. 2 is a partial longitudinal section through the valve mounted on a panel and arranged for connection to standard tubing; and Fig. 3 is a side view of the tubular body of the valve.

But these drawings and the corresponding description are used for the purpose of disclosure only, and are not intended to impose unnecessary limitations on the claim.

In the drawings, the tubular body indicated generally by B has at each end an external, threaded portion 10, an outwardly facing shoulder 11, and a reduced, outwardly directed flange 12 adapted to receive a circular gasket 13, circular in cross-section.

A valve cap 14 has internal threads 15 for engagement with one external, threaded portion 10 on the body, and which threads are spaced from an outer shoulder 16 adapted to bear against the shoulder 11 to limit the compression of the gasket 13 and the cap having an inner shoulder 17 adapted to compress the gasket against the shoulder 11.

The gasket may be made of a variety of materials, but it will be enough to say that it is made of solid rubber or rubber composition sufficiently yielding to spread under atmospheric pressure to effect an appropriate seal. It should have initial compression upon assembly to be increased when the pressure within the system is reduced, and atmospheric pressure acts on the outside of the gasket.

It has been found satisfactory for a gasket having a cross-section on the order of .103" to be compressed to about .075", and a gasket having a cross-section on the order of .070" to be compressed to about .045".

Preferably, the gasket is small enough to grip the flange 12 and to remain in place after being pressed on.

The cap has a central bore 18 to receive the end of the flange 12, and the clearance will be satisfactory when on the order of $3/1000''$ to $5/1000''$.

With such a construction and the parts assembled as shown in Fig. 2, when the pressure in the system is reduced and atmospheric pressure in the area 19 acts upon the gasket 13, it will spread so as to increase the pressure on the shoulders 11, 17, and the outer surface of the flange 12 and the gasket will also distend into the annular clearance between the flange 12 and the bore 24 to increase the seal to make sure there is no leakage.

At the right of Fig. 2, the body B is shown assembled with a sleeve 20 having an outer enlargement 21, an inner shoulder 22, and an outer shoulder 23 adapted to bear against the shoulder 11 at the right end of the body to limit the compression of the gasket 13 on the flange 12.

The annular flange 12 is received in a bore 24 in the sleeve with clearance on the order of $3/1000''$ to $5/1000''$, and serves as a guide during assembly.

At its right end, the sleeve 20 has a socket 25 adapted to receive standard tubing and to be secured to the tubing by welding, brazing, etc. Alternatively, it might be arranged for butt-welding or other connection.

Telescoped over the sleeve 20 is a compression nut 26 having internal threads 27 to engage the threaded portion 10 of the body and an internal shoulder 28 to bear against the inner shoulder 22 on the sleeve and clamp the shoulder 23 thereof against the shoulder 11.

Between the external, threaded portions 10, the tubular body B is provided with a flange 30 which extends radially outwardly from a circular base 31 and cooperates therewith to form a gasket seat adapted to receive a gasket 32 similar to the gasket 13 except of larger size and cross-section.

This is for the purpose of making connection to a bracket or panel, such as indicated at 33, having an opening 34 through which the right end threaded portion of the body B may be passed before receiving the compression nut 26. The bracket or panel is provided with a groove 35 to receive the gasket 32 and the seat 31 with clearance on the order of $3/1000''$ to $5/1000''$.

A nut 36 threaded on the right end threaded portion 10 of the body B clamps the body to the bracket or panel 33, and compresses the gasket 32. (The gasket 32 may be omitted in Fig. 2, but its presence is convenient when the valve is to be moved to the use shown in Fig. 1.)

In Fig. 1, there is shown a portion of a vacuum pump plate at 37 having a pump connection 38 at the center and adapted to receive the bell jar 39 to be exhausted.

The release valve is secured to such a pump plate by providing an opening or bore 40 threaded at 41 to receive one of the threaded portions 10 and surrounded by a counter bore 42 to receive a circular gasket 32, circular in cross section, adapted to be suitably compressed, as above indicated, with respect to the gasket 13 when the body B is threaded into the pump plate 37, as indicated in Fig. 1.

The gasket 13 permits the cap 14 to effectively seal one end of the body B against the unavoidable leakage paths between the threaded portions 10 and 15 by which the atmospheric air seeks to gain access and, therefore, when the cap 14 is backed off and the gasket seal becomes ineffective, the atmospheric air will travel through these leakage paths and relieve the internal vacuum.

It is not necessary that the limitations of the initial pressure on the gaskets 13 and 32 be effected by the shoulder 16, the shoulder 23, or the flange 30; but that is preferable, because these surfaces are nearest the access of atmospheric pressure, and this causes the gasket to be further compressed toward the system to be exhausted, and, if necessary, distorted toward the small clearance by which entrance to that system is effected.

The limitation may be set on the low pressure side of the gasket. In either arrangement, an annular contact is not necessary.

We claim:

In a vacuum release valve, a tubular valve body having an externally threaded portion terminating at its outer end in a flat radial shoulder surrounding a reduced axial flange and cooperating therewith to form a gasket seat, an O-ring gasket of relatively soft resilient material positioned on the seat, a valve cap having an open inner end and internally threaded for cooperation with the external threaded portion of said valve body, the threaded portions of said valve body and said valve cap constituting coacting sealing surfaces having leakage passages extending therethrough, the outer end of said cap being closed and formed with a pair of coaxial axially spaced flat radial shoulders, said cap shoulders being spaced apart a distance less than the thickness of said gasket, the outer end of the cap having an internal bore adjacent the outermost of said cap shoulders, the inner one of said cap shoulders being adapted to engage the said body shoulder whereby the gasket is compressed between the body shoulder and the outer one of said two cap shoulders by a predetermined amount, said reduced axial flange projecting into said inner bore of the cap to provide a relatively small annular space therebetween, said O-ring gasket being adapted to be distended toward and into said annular space when said cap is screwed tightly upon said tubular valve body and when the interior of the valve body is subjected to a vacuum to thereby provide an effective seal for the end of said valve body, said cap being adapted to be unscrewed by predetermined amounts to controllably release the vacuum in said tubular body.

References Cited in the file of this patent

UNITED STATES PATENTS

| | | |
|---|---|---|
| 1,299,571 | Grounds | Apr. 8, 1919 |
| 1,424,559 | Dodds | Aug. 1, 1922 |
| 1,534,793 | Lupton | Apr. 21, 1925 |
| 2,343,235 | Bashark | Feb. 29, 1944 |
| 2,459,668 | Melichar | Jan. 18, 1949 |
| 2,537,249 | Walton | Jan. 9, 1951 |
| 2,638,243 | Davies | May 12, 1953 |
| 2,657,825 | Erickson | Nov. 3, 1953 |

OTHER REFERENCES

The Petroleum Engineer (page 226), October 1938.